United States Patent [19]

Shiraga et al.

[11] Patent Number: 5,169,531

[45] Date of Patent: Dec. 8, 1992

[54] NOISE DIFFUSING FUEL FILTER

[75] Inventors: Jun Shiraga; Isamu Sato, both of Fukuyama, Japan

[73] Assignee: Mitsubishi Denki Kabushiki Kaisha, Tokyo, Japan

[21] Appl. No.: 729,885

[22] Filed: Jul. 11, 1991

Related U.S. Application Data

[63] Continuation of Ser. No. 482,535, Feb. 21, 1990, abandoned.

[30] Foreign Application Priority Data

Feb. 22, 1989 [JP] Japan .................................. 1-19938

[51] Int. Cl.$^5$ .............................................. B01D 35/02
[52] U.S. Cl. .................................... 210/460; 210/172; 210/416.4; 210/462; 210/456; 415/119; 415/121.2; 417/312
[58] Field of Search ...................... 210/172, 349, 416.4, 210/459-462, 456; 137/590; 417/312; 415/119, 121.2; 181/207, 208

[56] References Cited

U.S. PATENT DOCUMENTS

| | | | |
|---|---|---|---|
| 2,942,683 | 6/1960 | Moyer | 417/312 |
| 2,946,345 | 7/1960 | Weltmer | 137/590 |
| 3,108,065 | 10/1963 | McMichael | 210/172 |
| 4,556,490 | 12/1985 | Kemmner et al. | 210/349 |
| 4,617,121 | 10/1986 | Yokoyama | 210/460 |
| 4,684,463 | 8/1987 | Mizusawa | 210/172 |
| 4,734,008 | 3/1988 | Roth | 415/77 |

FOREIGN PATENT DOCUMENTS

| | | |
|---|---|---|
| 0384441 | 8/1990 | European Pat. Off. . |
| 8603736 | 5/1986 | Fed. Rep. of Germany . |
| 3509309 | 9/1986 | Fed. Rep. of Germany . |
| 8608099 | 2/1987 | Fed. Rep. of Germany . |
| 3609906 | 10/1987 | Fed. Rep. of Germany . |
| 55-177059 | 12/1980 | Japan . |
| 119907 | 8/1985 | Japan . |

OTHER PUBLICATIONS

Patent Abstracts of Japan, vol. 12, No. 31, Jan. 29, 1988.

Primary Examiner—Robert A. Dawson
Assistant Examiner—Matthew O. Savage
Attorney, Agent, or Firm—Burns, Doane, Swecker & Mathis

[57] ABSTRACT

In a fuel filtering device for a fuel pump (6) which is arranged in a liquid fuel tank (1) of vehicles and feeds the liquid fuel to an engine, a noise diffusing member (16, 17, 18) is provided at a suction opening (15a) of the fuel pump, to diffuse a noise, which is emitted out of the fuel pump, toward predetermined directions except a direction toward the bottom of the fuel tank.

5 Claims, 5 Drawing Sheets

NOISE DIFFUSING FUEL FILTER

This application is a continuation of application Ser. No. 07/482,535, filed Feb. 21, 1990, now abandoned.

FIELD OF THE INVENTION AND RELATED ART STATEMENT

1. FIELD OF THE INVENTION

This invention relates to a filtering device for a fuel pump which is arranged and used in a fuel tank of vehicles such as automobile or the like vehicles.

2. DESCRIPTION OF THE RELATED ART

FIG. 7 shows an arrangement of a fuel pump and a filtering device, such as disclosed in Unexamined Published Japanese Utility Model Application No. Sho 55-177059. In the drawing, numeral 1 designates a fuel tank, numeral 2 a liquid fuel accommodated in the fuel tank 1, numeral 3 a subsidiary tank, numeral 4 a plate secured to an upper opening portion of the fuel tank 1 with a sealing packing 5, and numeral 6 an electric-powered in-tank-type fuel pump. The fuel pump 6 is secured to the plate 4 with a vibration absorptive cushioning rubber 7 and arranged off the bottom of the fuel tank 1 by a supporting member 8, such as metal frame. The numeral 9 designates a suction tube secured to a suction hole 6a of the fuel pump 6. A suction opening 10 of the suction tube 9 opens downwardly and sucks the liquid fuel 2 through a filter 11 which is supported by the suction tube 9. A filtering device is constituted of the suction tube 9 and the filter 11. The numeral 12 designates a delivery pipe for feeding the liquid fuel which is pumped out by the rotation of an impeller (not shown) in the fuel pump 6. The numeral 13 designates a return pipe for returning an unemployed portion of the fuel which has been fed to an engine to the fuel tank 1.

In the above-mentioned conventional filtering device, when the fuel level lowers below the suction opening 10 owing to consumption of the fuel 2, the fuel pump 6 can not suck the fuel 2. Thereby, the vehicle can not run even with the fuel remaining in a space between the suction opening 10 and the bottom of the fuel tank 1. In this aspect, it is desirable to arrange the suction opening 10 as close as possible to the bottom of the fuel tank 1 by extending the suction tube 9.

Since the conventional filtering device is designed as described above, vibration and noise developed by the fuel pump 6 are fundamentally absorbed by the cushioning rubber 7 and the sealing packing 5. Thus, it is expected that the vibration and the noise are not transmitted to the outside of the fuel tank 1. However, the problem has been that the suction opening 10 faces the bottom of the fuel tank 1 with the filter 11 put therebetween. Accordingly, a noise of friction between the impeller and the bubbles caused by the rotations of the impeller in the fuel pump 6 during the sucking and pumping-out of the fuel 2, or a noise of the rotation of the fuel pump 6 itself propagates through the suction tube 9. And these noises go out from the suction opening 10 to the bottom surface of the fuel tank 1. Since the liquid fuel 2 is good medium for conducting these noises, the energy conductivity is good, so that these noises considerably vibrate the bottom surface of the fuel tank 1 and problematically develop noises unpleasant to a vehicle driver.

OBJECT AND SUMMARY OF THE INVENTION

The purpose of the present invention is to obtain a filtering device, wherein the sound energy emitted from or produced at the suction opening does not vibrate the bottom surface of the fuel tank, nor generate an unpleasant noise.

In order to achieve the above-mentioned purpose the fuel filtering device in accordance with the present invention comprises:
- a suction tube which extends from a suction hole of the fuel pump and is arranged near the bottom portion of the fuel tank;
- a noise diffusing member which is arranged at a suction opening of the suction tube for diffusing a noise which comes propagating through the suction tube from the fuel pump; and
- a filter for enclosing the diffusing member and the suction opening.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, preferred embodiments of the present invention are described with reference to the accompanying drawings.

Figure 1:
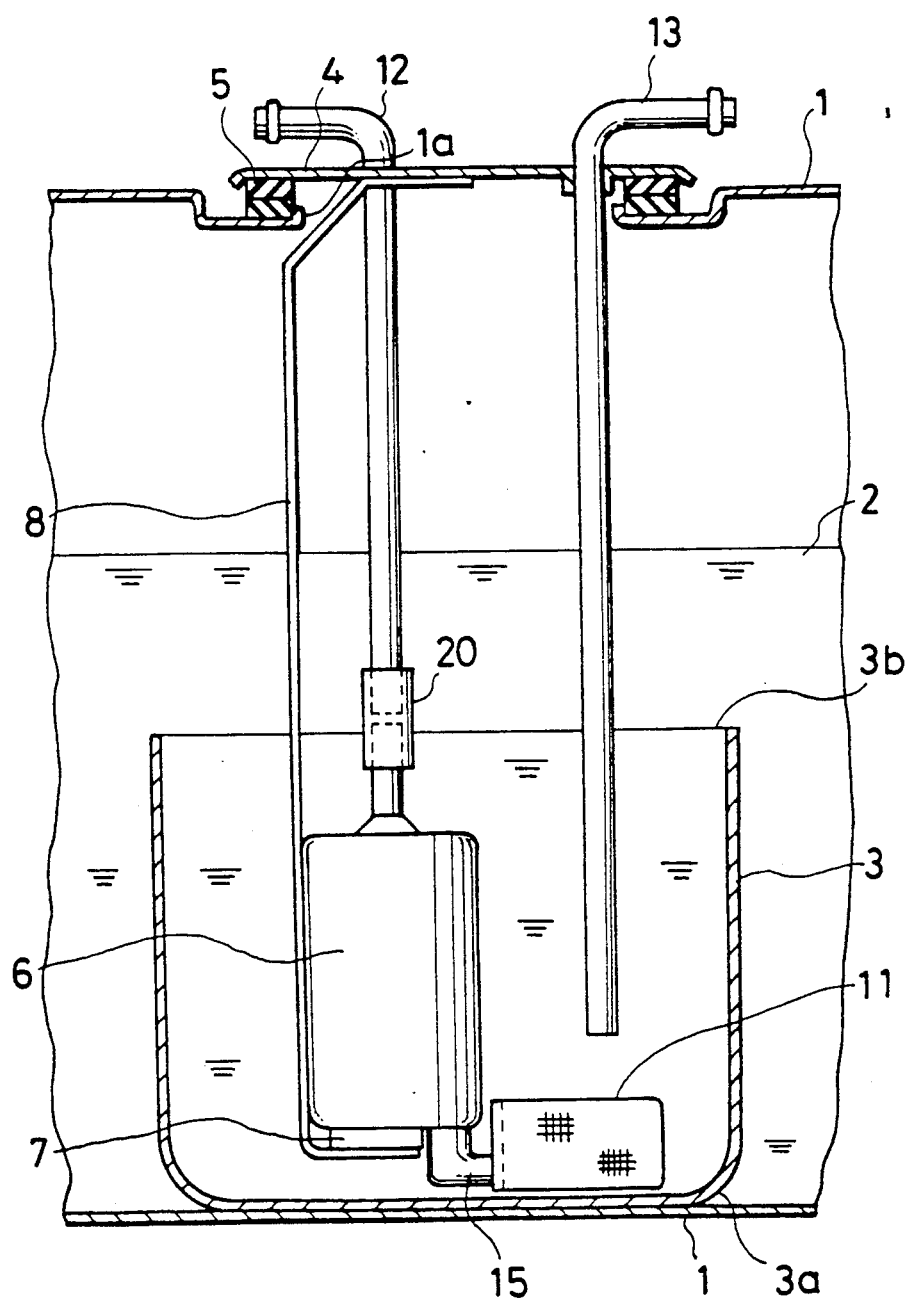
FIG. 1 is a cross-sectional side view showing a fuel tank including a fuel filtering device of an embodiment of the present invention.

FIG. 1 is a cross-sectional side view showing a fuel tank 1 including a fuel filtering device. Although the fuel tank 1 is of generally rectangular shape elongated in the horizontal direction, only a pertinent part thereof to the present invention is shown. In FIG. 1, a liquid fuel 2 is stored in the fuel tank 1, and a cup-shaped subsidiary tank 3 is fixed to the fuel tank 1. The subsidiary tank 3 has a hole (not shown), which makes fuel-communication between an inside and an outside of the subsidiary tank 3, at a lower wall part 3a. A plate 4 is secured to an upper opening portion 1a of the fuel tank 1 with a sealing packing 5. An electric-powered in-tank-type fuel pump 6 is secured to the plate 4 with an vibration absorptive cushioning rubber 7 and arranged off the bottom of the subsidiary tank 3 by a supporting member 8 such as metal frame. A delivery pipe 12, which couples with the fuel pump 6 via a rubber hose 20, feeds the liquid fuel 2 which has been pumped out by the rotation of an impeller (not shown) in the fuel pump 6. A return pipe 13 is secured to the plate 4 and is used for returning an unemployed portion of the fuel, which has been fed to an engine (not shown), to the fuel tank 1. A fuel filtering device is mainly constituted of a suction tube 15 and a filter 11. The liquid fuel 2 in the subsidiary tank 3 is sucked into the fuel pump 6 through the filter 11 and the suction tube 15.

Figure 2:
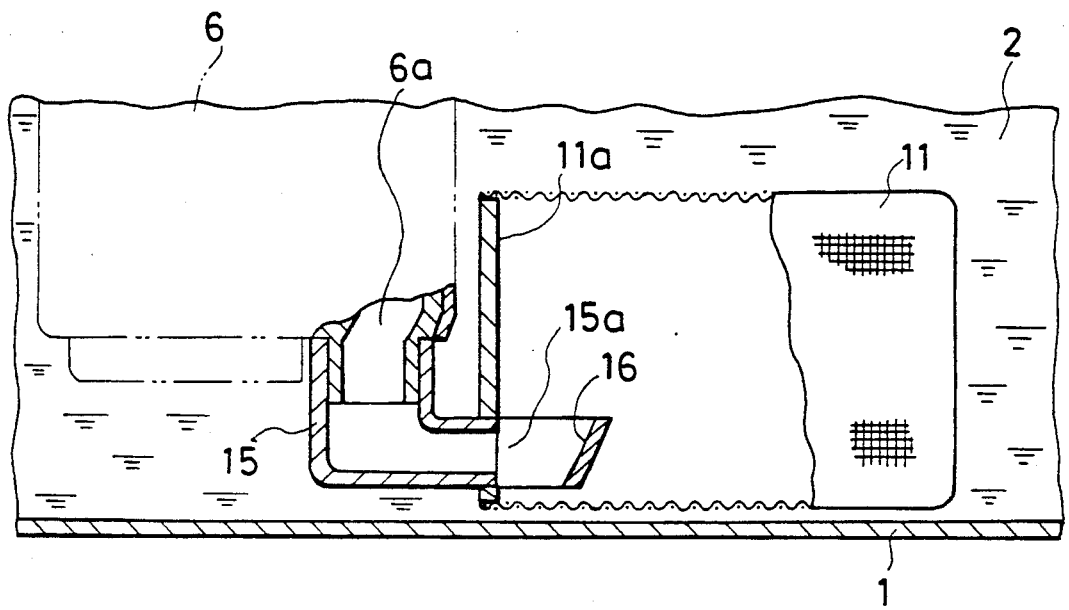
FIG. 2 is a partially enlarged cross-sectional side view of FIG. 1.
Figure 3:
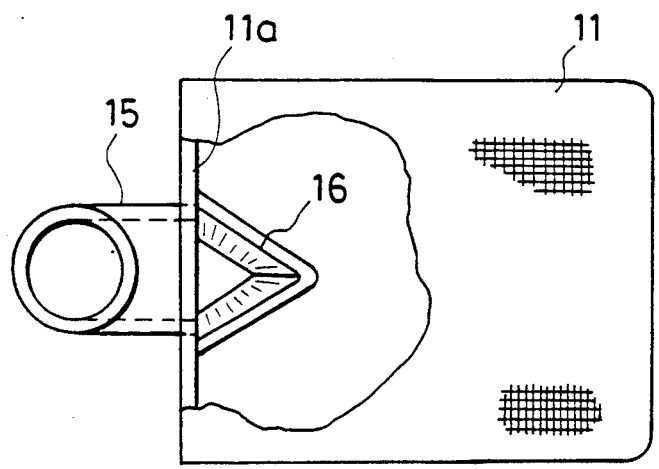
FIG. 3 is a plane view showing a suction tube 15, a supporting member 11a, a diffusing member 16 and a filter 11.

FIG. 2 is a partially enlarged cross-sectional view showing the fuel filtering device, and FIG. 3 is a plane view showing main parts in FIG. 2. A supporting member 11a is provided to keep the filter 11 in a designed shape. An end of a suction tube 15 is connected to a suction hole 6a, and the other end part penetrating through the supporting member 11a has a suction opening 15a and a diffusing member 16 with a first and second wall which converge to form an apex. A periphery of the supporting member 11a is positioned closely to the suction opening 15a, and the first and second walls are tilted to deflect noise towards the center of the interior volume of the filter. The suction opening 15a is disposed as close as possible to the bottom of the fuel tank 1, and the diffusing member 16 is obliquely facing the suction opening 15a so as not to reflect a sound wave coming from the suction opening 15a toward the bottom of the fuel tank 1. The first and second walls are tilted away from one another so that the first and second walls are at an oblique angle to a line perpendicular to an axis from the center of the suction opening 15a to the apex.

In the fuel filtering device of the above-mentioned embodiment, the sound wave developed in the fuel pump 6 is emitted out of the suction hole 6a and further emitted out of the suction opening 15a through the suction pipe 15. The sound wave emitted out of the suction opening 15a reaches the diffusing member 16. Then, the diffusing member 16 diffuses the sound wave and reflects it in various direction other than the direction toward the bottom surface of the fuel tank 1. Therefore, the bottom of the fuel tank 1 does not receive the sound wave of noise and is not vibrated, and hence the fuel tank 1 does not make an unpleasant noise.

Figure 4:
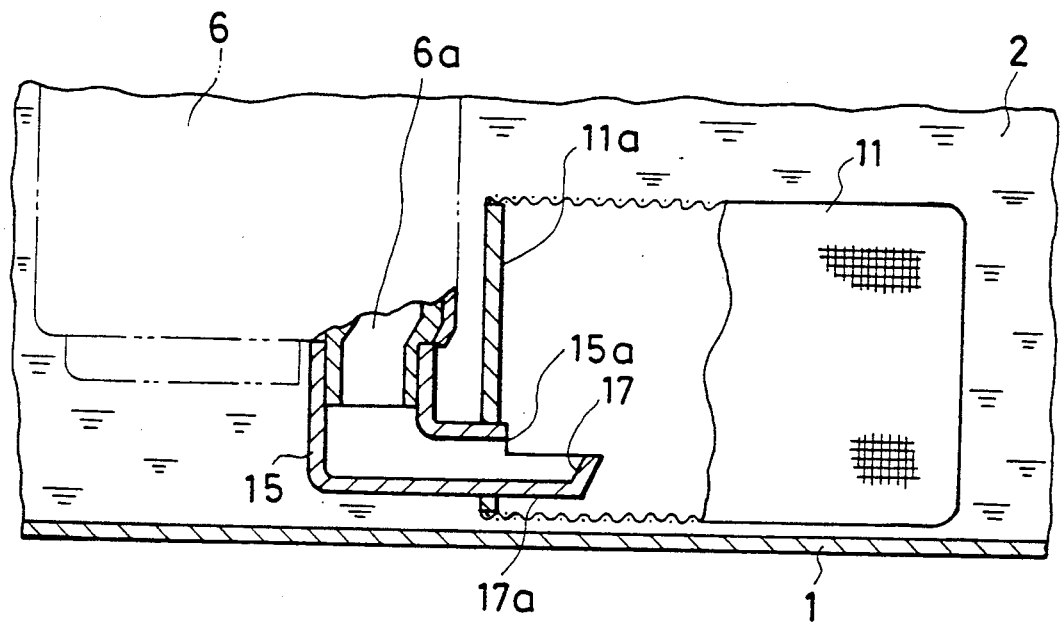
FIG. 4 is a partially enlarged cross-sectional side view of FIG. 1 as a second embodiment of the present invention.

FIG. 4 is a cross-sectional view showing the fuel filtering device of a second embodiment. In the figure, the numerals 1, 6, 6a, 11, 11a, 15 and 15a designate similar parts which are designated by these numerals in the above-mentioned first embodiment. A diffusing member 17 is provided to obliquely face the suction opening 15a, thereby reflecting the sound wave away from the bottom surface of the fuel tank 1. Between the suction opening 15a and the diffusing member 17, a shielding plate 17a is provided so as to shield direct reaching of the sound wave of noise from the suction opening 15a to the bottom surface of the fuel tank 1 the diffusing member 17, the shielding plate 17a and the suction tube 15 all being integrally connected.

In this embodiment, since the sound wave of noise, which is emitted from the suction opening 15a and propagates downwardly, is shielded by the shielding plate 17a, reaching of the sound wave of noise to the bottom of the fuel tank 1 can be reduced further.

Figure 5:
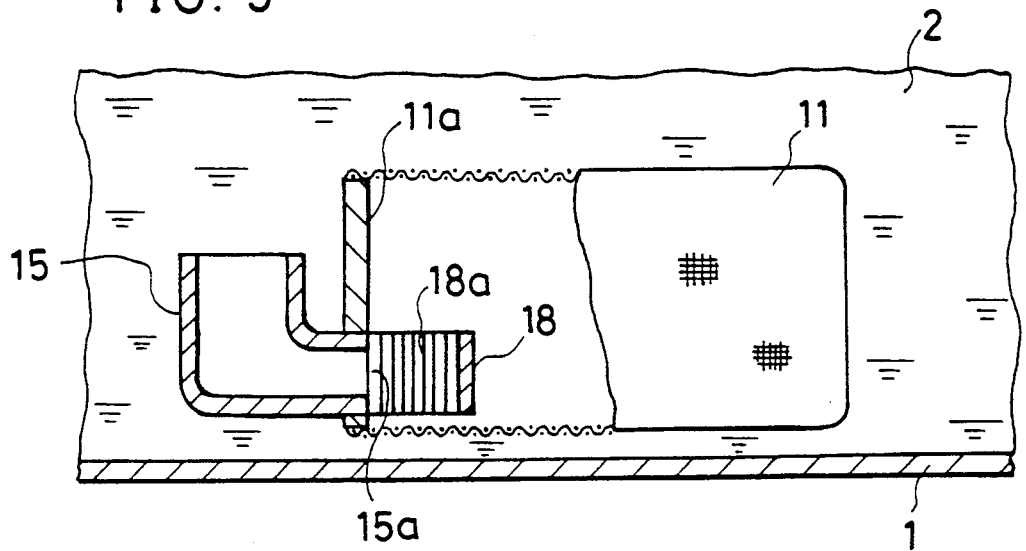
FIG. 5 is a partially enlarged cross-sectional side view of FIG. 1 as a third embodiment of the present invention.
Figure 6:
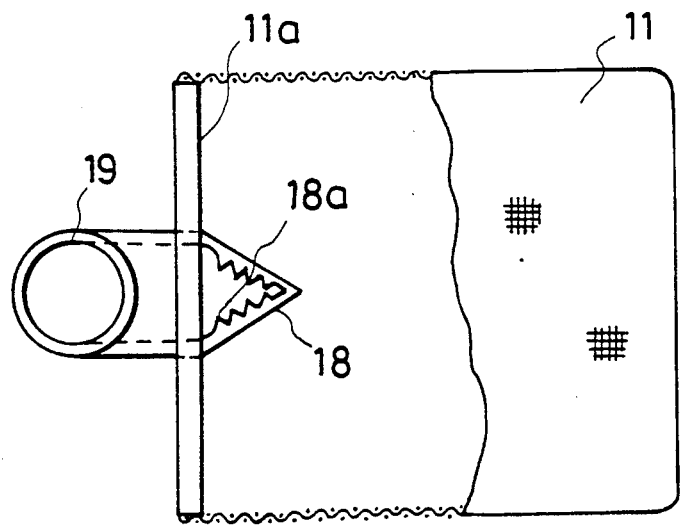
FIG. 6 is a plane view of FIG. 5.
Figure 7:
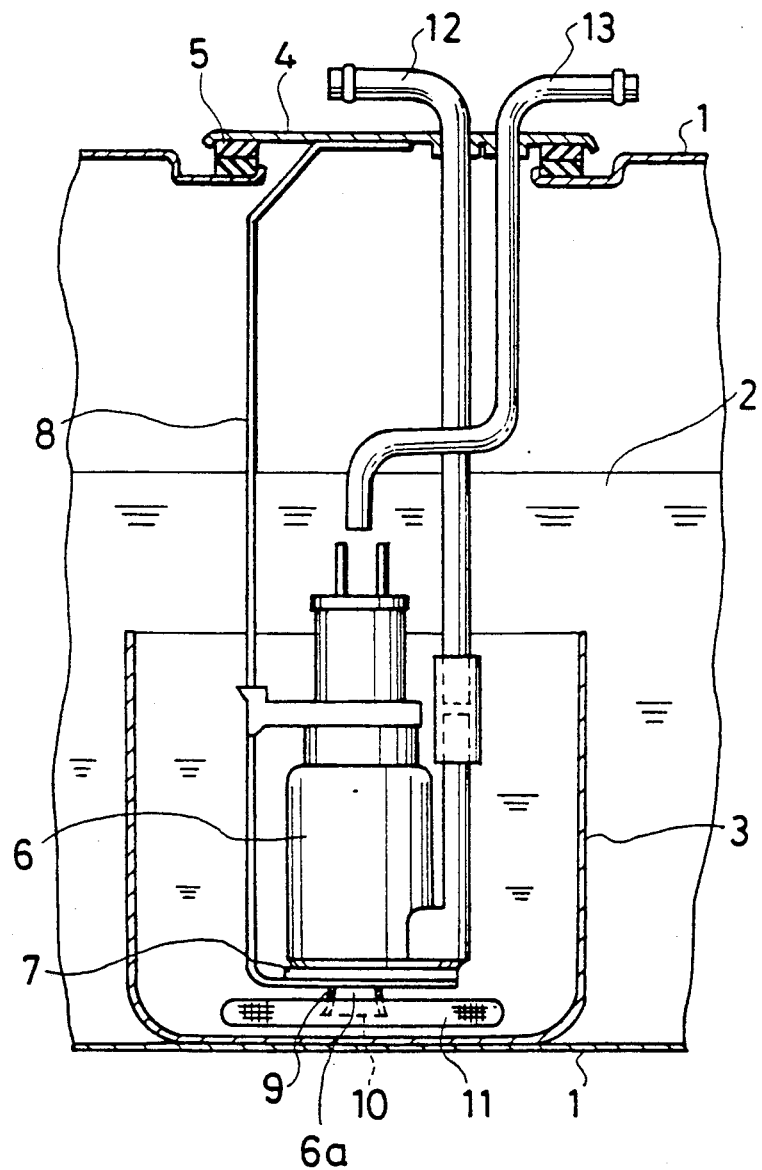
FIG. 7 is a cross-sectional side view showing the fuel tank including the conventional fuel filtering device.

FIG. 5 is a cross-sectional view showing the fuel filtering device of a third embodiment, and FIG. 6 is a plan view of FIG. 5. In these figures, the numerals 1, 11, 11a, 15 and 15a designate similar parts which are designated by these numerals in the above-mentioned first embodiment. A diffusing member 18 is vertically provided to obliquely face the suction opening 15a, and an inner surface of the diffusing member 18 is formed to have a saw-tooth-shaped concave and convex 18a extended in the vertical direction.

In this third embodiment, the sound wave of noise which is emitted from the suction opening 15a is scattered by the irregularity of the concave and convex 18a, such that the reflected sound wave of noise is not concentrated to a particular direction. Therefore, undesirable vibration of the fuel tank 1 due to reception of the concentrated noise sound wave is eliminated.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A fuel filtering device comprising:
   a suction tube having a suction opening;
   a filter member connected to said suction opening; and
   a noise diffusing member supported by said suction tube and disposed obliquely to and extending away from said suction opening into an interior of said filter member wherein said noise diffusing member comprises a first wall extending away from one side of said intake opening and a second wall extending away from another side of said intake opening, said first and second walls converging to an apex pointing away from said intake opening.

2. A fuel filtering device as claimed in claim 1 wherein said first wall and said second wall each has an irregularly shaped surface on a side facing said suction opening.

3. A fuel filtering device comprising:
   a suction tube having a suction opening;
   a filter member connected to said suction opening; and
   a noise diffusing member supported by said suction tube and extending away from said suction opening into an interior of said filter member and arranged to deflect sound propagating through said suction tube comprising a first wall extending away from one side of said suction opening and a second wall extending away from another side of said suction opening, said first and second walls converging to an apex pointing away from said suction opening wherein said first wall and said second wall are tilted away from one another so that the first and second walls are at an oblique angle to a line perpendicular to an axis from a center of said suction opening to said apex.

4. A fuel filtering device comprising:
   a filter member including a filter and a support for said filter, said support having a suction opening and holding said filter in a form such that said filter encloses an interior volume; and
   a suction tube having a suction opening and connected to said interior volume of said filter member through said suction opening, said suction tube including a noise diffusing member supported by said suction tube having a first wall extending into said interior volume of said filter away from one side of said suction opening and a second wall extending into said interior volume of said filter away from another side of said suction opening, said first and second walls converging to an apex pointing away from said suction opening wherein said first and second walls are tilted away from one another so that the first and second walls are at an oblique angle to a line perpendicular to an axis from a center of said suction opening to said apex.

5. A fuel filtering device as claimed in claim 4 wherein a periphery of said support is positioned closely to said suction opening, and said first wall and said second wall being tilted to deflect noise towards a center portion of said interior volume.

* * * * *